United States Patent
Adrian

[11] 3,727,225
[45] Apr. 10, 1973

[54] RANGING AND DETECTION SYSTEM

[75] Inventor: Donald J. Adrian, Corona, Calif.

[73] Assignee: The United States of America as represented by the Secretary of the Navy

[22] Filed: May 29, 1962

[21] Appl. No.: 199,568

[52] U.S. Cl. ........343/112 R, 343/100 R, 343/112 D
[51] Int. Cl. .................................................G01s 5/00
[58] Field of Search .....................343/112, 113, 18 B, 343/110.11, 100, 100.7

[56] References Cited

UNITED STATES PATENTS

| | | | |
|---|---|---|---|
| 2,800,654 | 7/1957 | De Rosa | 343/100.7 UX |
| 2,817,081 | 12/1957 | Roberts | 343/112 UX |
| 3,112,484 | 11/1963 | McKeown | 343/112 |

Primary Examiner—Benjamin A. Borchelt
Assistant Examiner—Richard E. Berger
Attorney—Q. Baxter Warner, J. M. St. Amand and T. M. Phillips

EXEMPLARY CLAIM

2. A method for detecting long range missiles, nuclear explosions and the like at great distances comprising the steps of:
   a. utilizing the VLF portion of a lightning spectrum generated by lightning from a plurality of storms from thunderstorms concentrated in a certain geographical area as a fixed reference point source of VLF illuminating energy,
   b. detecting a signal directly from said lightning source of VLF energy for use as a reference signal,
   c. detecting said signal after being reflected from an ionospheric perturbation caused by any of missile exhaust trails, nuclear explosions and the like for use as a reflected energy signal,
   d. detecting said direct reference signal and said reflected energy signal at the same detection point,
   e. correlating the reference signal with the reflected energy signal to produce an output signal which represents the range between the ionospheric perturbation and the detection point.

2 Claims, 6 Drawing Figures

DONALD J. ADRIAN
INVENTOR.

BY

ATTORNEYS

RANGING AND DETECTION SYSTEM

The invention herein described may be manufactured and used by or for the Government of the United States of America for governmental purposes without the payment of any royalties thereon or therefor.

The present invention relates to a ranging and detection system and more particularly to a ranging and detection system which can detect nuclear explosions and long range missiles having long ionized trails generated beneath the ionosphere by the rocket exhaust.

In view of the rapid advancements in the field of long range missiles, it is desirable to detect the launching of a missile by a hostile nation as soon as possible after launching. Various systems have been devised to detect these missiles; however, all well-known types of detecting systems are limited to line of sight operation, and depend on the missile having a large back scattering cross-section area. All systems of this type thus have the disadvantage of being basically short range in operation. The present invention provides a system capable of operating far beyond the line of sight by making use of low frequency waves. These frequencies have low attenuation and the ionization trail left by a rocket exhaust makes a good reflector which is many times larger than the missile itself. In the past VLF stations have been used as the illuminating source for the low frequency energy. The use of VLF stations as the illuminating source has the disadvantage that existing stations have very narrow transmitting bandwidths, thus limiting the range resolution obtainable from a single sight. Also, there is the problem of transmitter maintenance. The present invention uses the VLF portion of the lightning spectrum of a lightning source. There are several areas throughout the world which can be considered as a VLF noise source as for example, in South America the area of Brazil. A thunderstorm area can be considered as a fixed point source of VLF energy and the energy from the lightning is picket up through a filter of a few hundred cycles bandwidth to be used as the reference signal. The reference signal is delayed the proper amount so that it will match up or correlate with the reflected signal from the target to be detected. The reflected signal is amplified and passed through a similar filter. The two signals are fed to a dual channel correlator and the output is coupled to a display device.

Accordingly, an object of the present invention is the provision of a system capable of detecting missiles or nuclear explosions at distances which heretofore were not possible.

Another object is to detect long range missiles or nuclear explosions at a distance of at least three thousand miles from its point of launching.

A further object of the invention is to provide a ranging and detection system for detecting nuclear explosions and long range missiles by means of utilizing the VLF portion of a lightning spectrum combined with ionized trail reflections of missiles.

Other objects and many of the attendant advantages of this invention will become readily appreciated as the same becomes better understood by reference to the following detailed description when considered in connection with the accompanying drawings wherein.

Figure 3:
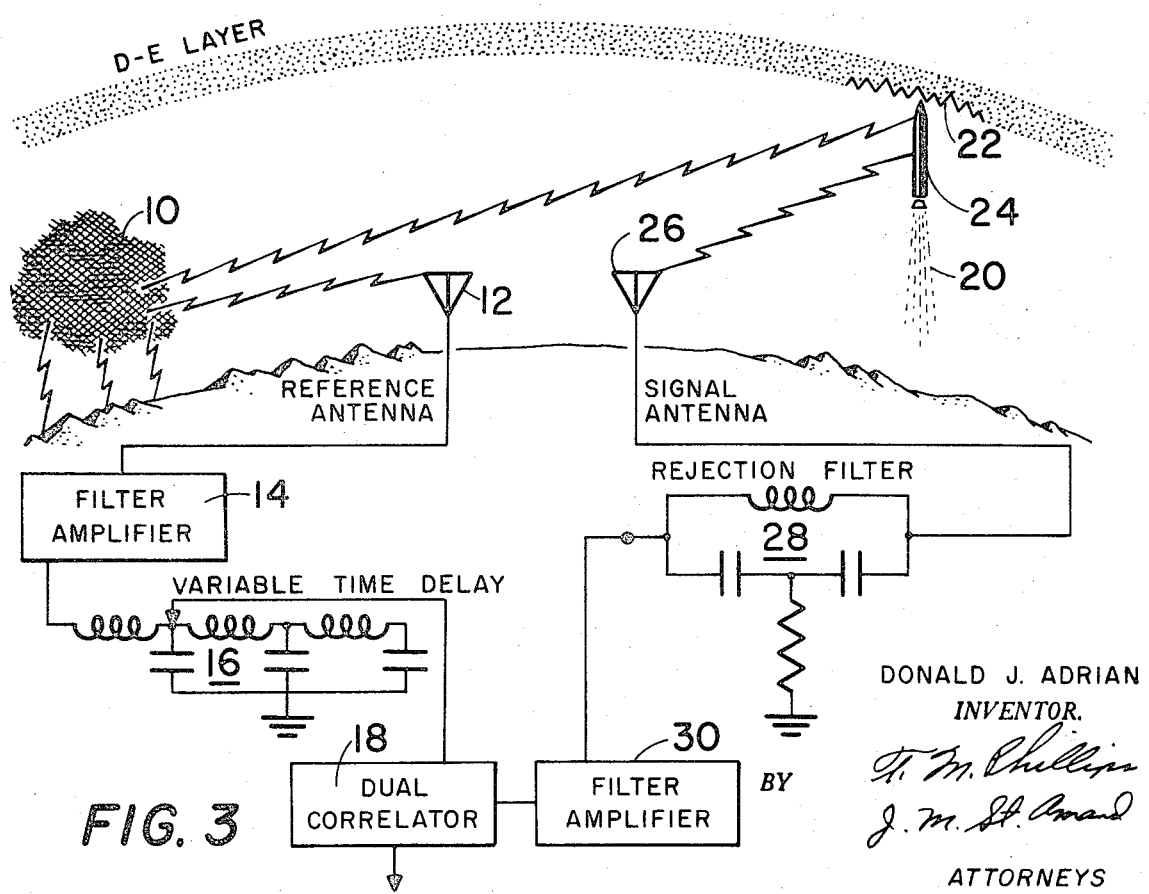
FIG. 3 is a diagramatic showing of a preferred embodiment of the invention.

Referring now to the drawings there is shown in FIG. 3 a thunderstorm area 10 which can be considered as a fixed point source of VLF illuminating energy. In general VLF noise sources will be concentrated in certain geographical areas, as for example, the area of Brazil. VLF noise source regions are well known and documented such as in the Air Force Geophysical Handbook. Knowledge of location of these thunderstorm zones is important for site selection of the detection system as will be described below. For the purposes of understanding this detection system, a thunderstorm area can be considered as a fixed point source of VLF energy and the energy from the lightning is picked up through a filter of a few hundred cycles bandwidth to be used as the reference signal. The reference signal for the system is obtained by means of a reference channel which includes reference antenna 12, filter amplifier 14 and variable time delay 16. The output reference signal is coupled from the output of time delay 16 as one of the inputs to dual correlator 18. Energy from noise source 10 is reflected from the exhaust trail 20 and/or ionospheric perturbations 22 caused by missile 24. The reflected energy is received by signal antenna 26 and fed through rejection filter 28 and filter amplifier 30 to dual correlator 18.

Figure 1:
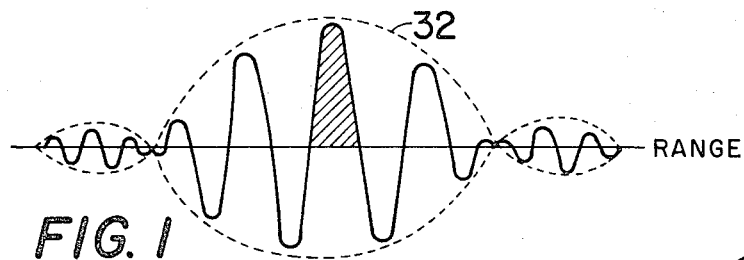
FIG. 1 is a plot of the range gate utilized in the present invention.
Figure 4:
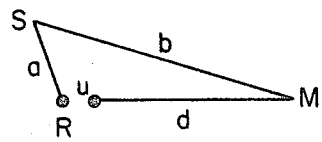
FIG. 4 is a diagram used in explaining the principal of operation.

The autocorrelation function, or range gate, is given by the following equation:

$$\frac{\sin 2\pi B(T-\tau)}{2\pi B(T-\tau)} \cos \omega(T-\tau) \qquad (1)$$

where B is the bandwidth of the filter 28, $\omega$ is the center frequency, T is the delay time of variable time delay 16 in the reference channel, and Y is the propagation time difference between the reference and back scatter signals. The range gate for the quadrature channel is given by $$\frac{\sin 2\pi B(T-\tau)}{2\pi B(T-\tau)} \sin \omega(T-\tau) \qquad (2)$$

this function is shown in FIG. 1. The width, D, of the major lobe in FIG. 1 is found to be $$D = C/2B \qquad (3)$$

where C is the velocity of light. This gives a measure of the width of the range gate. Other random signals will give different shapes of correlation functions. For example, rectangular pulses with random repetition rate and constant duration will give a triangular envelope. However, the width of the range gate is similar to that given by equation 3. With reference to distributed sources of VLF energy, FIG. 4 shows an open triangle, Leg a of the triangle represents the distance from the source, S, to the radar receiver, R, which includes both reference antenna and signal antenna; leg b represents the distance from the source, S, to the missile, M; and leg d represents the distance from the missile to the radar. The open portion of the triangle, $u$, is the equivalent distance of the radar internal time delay.

Sources for which $$0 \leq a+u-(b+d) < \lambda/2 \quad (4)$$

where $\lambda$ is the wave length of the radiation, will contribute to the center positive lobe of FIG. 1. Similarly, a negative output will result from sources for which the quantity in equation 4 is between $\lambda/2$ and $\lambda$. The boundaries of the areas giving rise to the various lobes in FIG. 1 are given by $$b-a = u-d-(n\lambda/2) \quad (5)$$

Where $n$ is an integer.

Equation 5 be put in the form of a hyperbola $$\sqrt{(x+c)^2+y^2} - \sqrt{(x-c)^2+y^2} = 2A \quad (6)$$

if we let $C = d/2$
and $2A = u - d - (n\lambda/2)$

Figure 2:
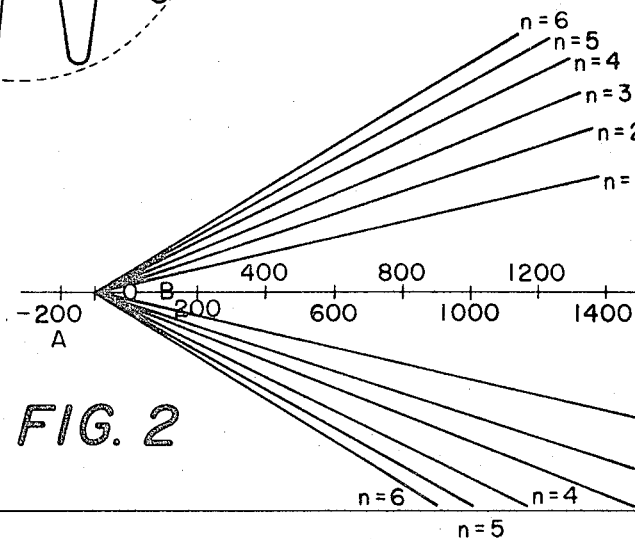
FIG. 2 is a graph showing lightning source distribution.

The asymptotes of the hyperbolas originate midway between the radar located at point O and the missile located at point 200 on the abscissa scale of the graph shown in FIG. 2 and to a close approximation gives the source distribution contributing to a reflection signal. If we let $u = 2d$ in equation 6, the slope of the asymptotes is found to be $$\sqrt{\frac{n\gamma d - (n\gamma/2)^2}{d - (n\gamma/2)}} \quad (7)$$

Figure 5A:
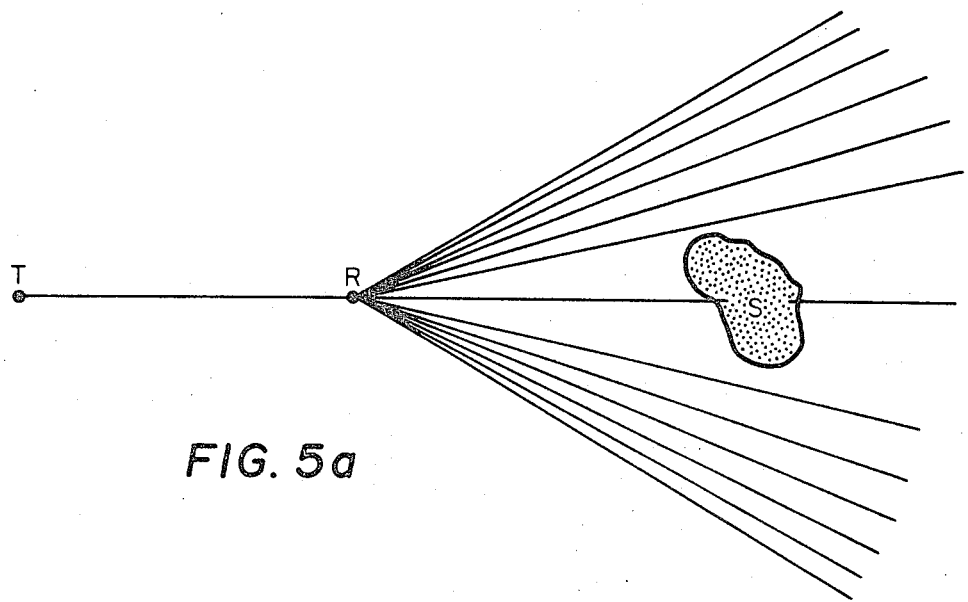
FIGS. 5a and 5b are graphs to further illustrate the lightning source distribution of FIG. 2.

Lightning sources located between the two $n = 1$ of FIG. 2 lines will contribute to the main lobe 32 in the range gate shown in FIG. 1. Since only lightning sources located between the two $n = 1$ asymptotes of FIG. 2 will contribute to the main lobe in the range gate shown in FIG. 1, only reflected signals from targets whose bearing from the radar (located at 0, FIG. 2) is almost exactly opposite to the source bearing will produce a system output. Range is then determined by multiplying the speed of light, $c/2$, times the time delay, $\tau$, of variable time delay 16 required to correlate the reference signal with the reflected or target signal to produce a spike or peak as shown by the shaded portion of the waveform of FIG. 1. The fact that this is the case can possibly be best illustrated by the reference to FIG. 5a which is a diagram for the condition discussed above, that is, a thunderstorm source area is chosen, such as the Amazon River region, and the detection system located such that it is placed on the great circle path extending from the source region to the target region to be maintained under surveillance. It is important to emphasize that the system in practice utilizes a thunderstorm area which means that there are many different point sources each at a different geographic location thereby each source producing a unique elipse for a constant range delay. These elipses of maximum detection sensitivity have one and only one common point of intersection that being at point T of FIG. 5a. Consider now the sensitivity of the system to a target region T presented in FIG. 5b which is located such that a great circle path from this target through the detection system location does not traverse the thunderstorm region chosen for the illumination source.

Figure 5B:
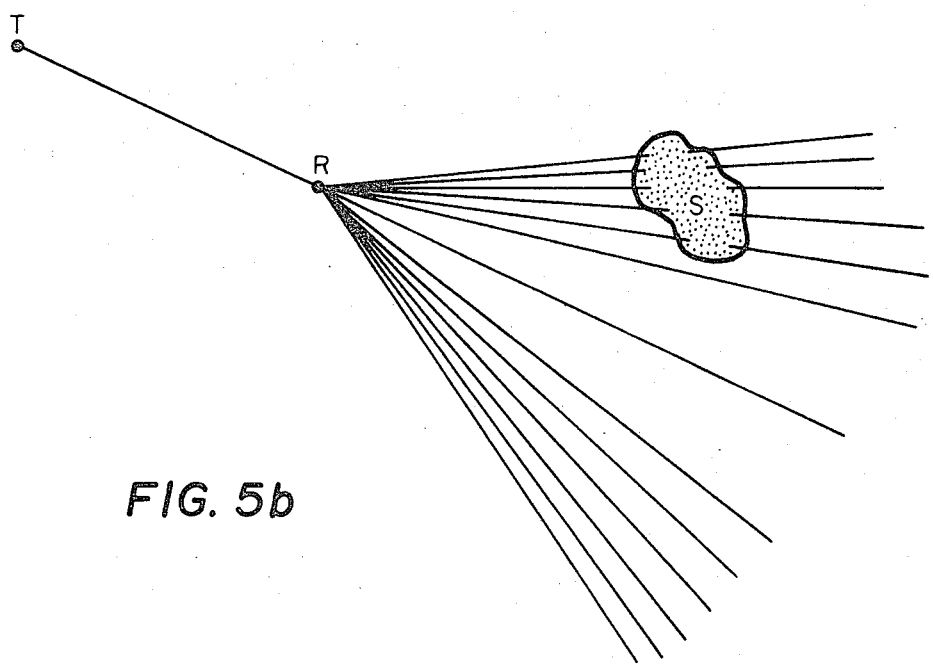

The contour lines presented in FIG. 2 now intersect the source region such that many lines traverse the source as illustrated in FIG. 5b. From previous discussion it is noted that each sector between adjacent lines contributes a different sense, that is polarity, of signal at the output of correlator 18. The combinations of positive and negative polarities from the many different sections which result from lightning discharges within an integration period of the detection system provide very low resultant sensitivity. This is true because a detected energy from lightning impulses from the different sectors compete against each other. Thus, it is that only under those conditions which is presented by the geometric relationship in FIG. 5a that a target will be sensed with the detection system. Therefore, the range to the target can be determined as described above.

In the operation of the system, reflections from a target are correlated with the reference signal which produces an output signal which can be calibrated in range.

Obviously many modifications and variations of the present invention are possible in the light of the above teachings. It is therefore to be understood that within the scope of the appended claims the invention may be practiced otherwise than as specifically described.

What is claimed is:

1. In a detection system for detecting long range missiles having a large ionized vapor trail the combination comprising:
    a. Very Low Frequency electromagnetic energy receiving means for receiving directly radio frequency energy generated by lightning from a plurality of storms in a thunderstorm area and for receiving reflections from the ionized vapor trail of the radio frequency energy generated by lightning from said plurality of storms in said thunderstorm area,
    b. and electric circuit means for using said directly received radio frequency energy as a reference and correlating said reflected radio frequency energy to produce an output signal proportional to the range between said receiving means and said ionized vapor trail.

2. A method for detecting long range missiles, nuclear explosions and the like at great distances comprising the steps of:
    a. utilizing the VLF portion of a lightning spectrum generated by lightning from a plurality of storms from thunderstorms concentrated in a certain geographical area as a fixed reference point source of VLF illuminating energy,
    b. detecting a signal directly from said lightning source of VLF energy for use as a reference signal,
    c. detecting said signal after being reflected from an ionospheric perturbation caused by any of missile exhaust trails, nuclear explosions and the like for use as a reflected energy signal,
    d. detecting said direct reference signal and said reflected energy signal at the same detection point,
    e. correlating the reference signal with the reflected energy signal to produce an output signal which represents the range between the ionospheric perturbation and the detection point.

* * * * *